United States Patent [19]

Rosenberg et al.

[11] Patent Number: 4,755,764
[45] Date of Patent: Jul. 5, 1988

[54] ELECTROMAGNETIC WAVE AMPLIFIERS AND GENERATORS

[75] Inventors: Avner Rosenberg, Moshav Beit Shearim; Jacob Politch, Haifa; Yaacob Ben-Aryeh, Haifa; Joshua Felsteiner, Haifa, all of Israel

[73] Assignee: Technion Research & Development Foundation Ltd., Haifa, Israel

[21] Appl. No.: 323,693

[22] Filed: Nov. 20, 1981

[30] Foreign Application Priority Data

Apr. 8, 1981 [IL]  Israel .......................................... 62609

[51] Int. Cl.$^4$ .............................. H01S 3/00; H01J 7/24
[52] U.S. Cl. ......................................... 330/4.3; 372/85; 372/2
[58] Field of Search .................. 330/4, 4.3; 372/2, 4, 372/74, 85, 86, 87

[56] References Cited

U.S. PATENT DOCUMENTS

| | | | |
|---|---|---|---|
| 3,177,435 | 4/1965 | Marcuse | 372/74 |
| 3,831,052 | 8/1974 | Knechtli | 372/85 |
| 4,193,042 | 3/1980 | Wang | 372/88 |
| 4,205,278 | 5/1980 | George et al. | 372/74 |
| 4,287,487 | 9/1981 | Kuwabara et al. | 372/85 |
| 4,323,857 | 4/1982 | Brau et al. | 372/69 |
| 4,367,551 | 1/1983 | Gover | 372/2 |

FOREIGN PATENT DOCUMENTS 0197810 10/1978 Canada ................................ 372/85

OTHER PUBLICATIONS

Gover, "Collection and Single Electron . . . Lasers", 6/78, Appl. Phys., (Germany), vol. 16, #2, pp. 121–138.
Opher et al., "The Effect of . . . Radiation", 6/78, pp. 701–702, Appl. Phys. Lett., vol. 32, #11.

Primary Examiner—Nelson Moskowitz
Attorney, Agent, or Firm—Benjamin J. Barish

[57] ABSTRACT

In a method and apparatus for amplifying and/or generating electromagnetic wave radiation, a gas plasma region having a non-Maxwellian electron distribution is produced by effecting collisions between scattering particles in the gas with free electrons which have been accelerated to an energy level which is greater than that providing maximum probability of collision of the electrons with scattering particles in said gas; and the electromagnetic wave radiation is subjected to the plasma region such as to produce amplification of the radiation by stimulated emission of Bremstrahlung from scattered free electrons in the plasma region.

24 Claims, 5 Drawing Sheets

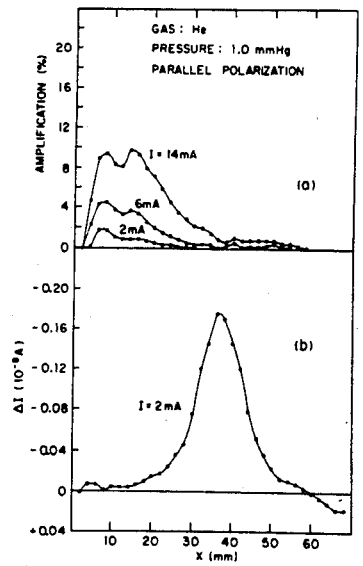
FIG. 2 (a) Amplification vs the distance X from the cathode. (b) Current change ΔI vs X.
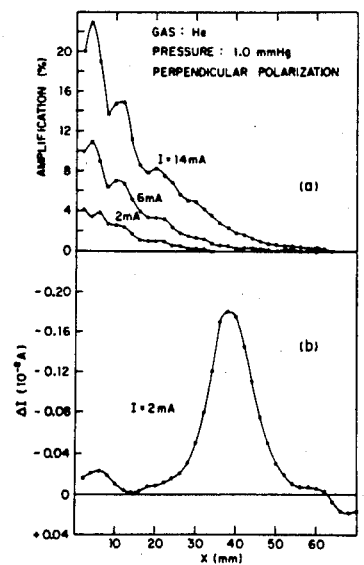
FIG. 3 (a) Amplification vs the distance X from the cathode. (b) Current change ΔI vs X.
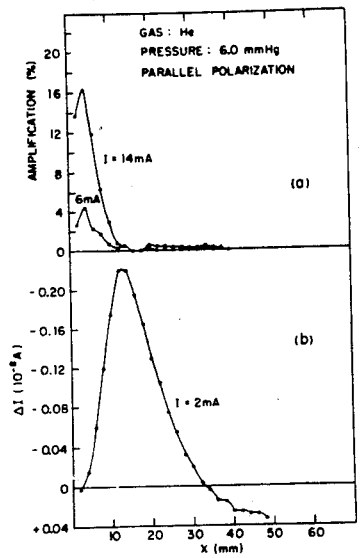
FIG. 4 (a) Amplification vs the distance X from the cathode. (b) Current change ΔI vs X.
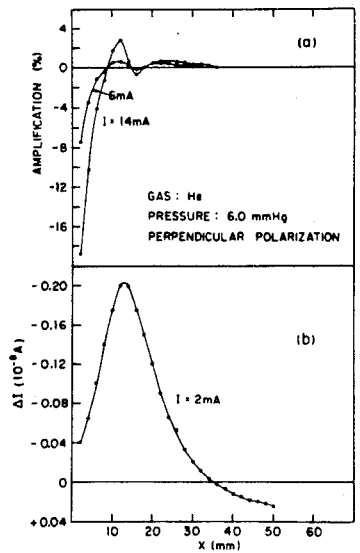
FIG. 5 (a) Amplification vs the distance X from the cathode. (b) Current change ΔI vs X.

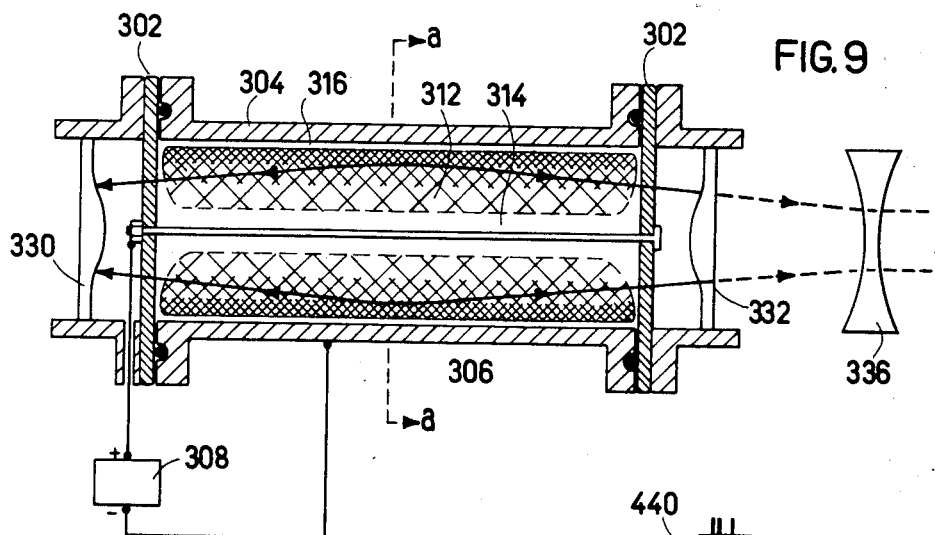
FIG. 9
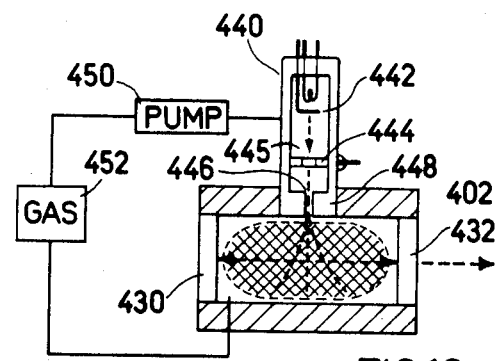
FIG 9a
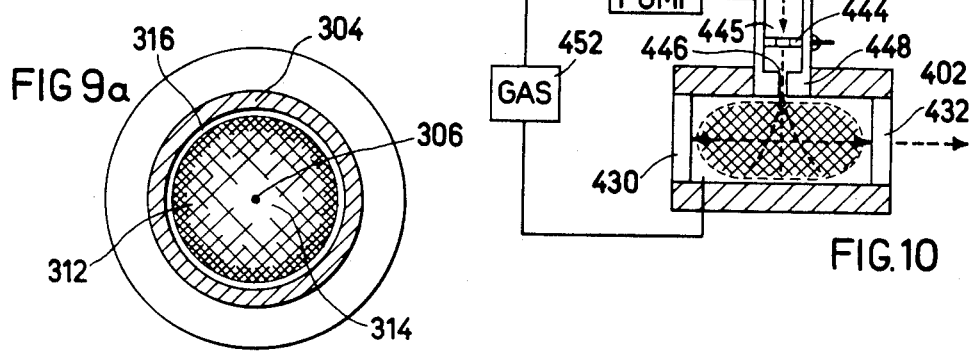
FIG.10
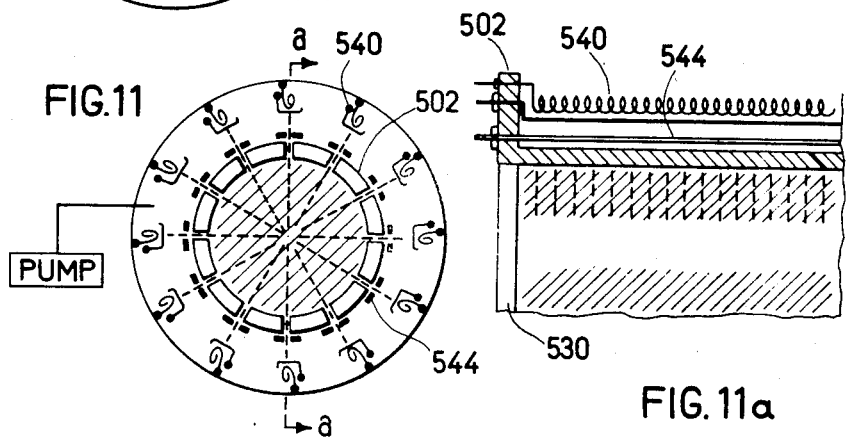
FIG.11
FIG.11a

ELECTROMAGNETIC WAVE AMPLIFIERS AND GENERATORS

BACKGROUND OF THE INVENTION

The present invention relates to a method of amplifying and/or generating electromagnetic wave radiations, particularly microwaves, and also to amplifiers and tunable microwave generators (masers or lasers) operating in accordance with such method.

Known Types of Microwave Generators

Masers (or lasers) are microwave generators, based on the Microwave (or Light) Amplification by Stimulated Emission of Radiation, which produce a very coherent radiation of very narrow frequency band width. The conventional masers or lasers exploit transitions between discrete levels of bound electrons in atoms, molecules, ions or solids. Their frequency is fixed by these transitions, and therefore, if they are tunable at all, they are tunable only in a narrow range. Another limitation of the conventional maser (or laser) is its generally low efficiency at "long" wavelengths (in the mm and sub-mm wavelength). Further, those of solid state constructions have limited power levels. Many of the gas types (e.g., the HeNe) cannot produce high power levels and are not efficient, whereas the $CO_2$ laser, which can produce very high power levels, can operate only at the wavelength of 10.6 $\mu$m.

Other known types of microwave generators are generally classified as follows:

1. Solid State Devices: These include the IMPATT diode, the Gunn diode, and the like, which produce electromagnetic radiations at the microwave wavelength. They are small, compact, and operate at low voltages. However, these devices are not based on stimulated processes, and therefore their radiation is not very clean and coherent. Moreover, they are tunable in a narrow range only, and are limited to very low power levels.

2. Free Electron Devices: These achieve amplification by "free" electrons. However, a completely free electron cannot emit or absorb a photon of the radiation, and therefore these devices include some form of construction which acts as a "third body" and enables the electron to emit or absorb photons.

(a) Klystrons: These are probably the oldest type of microwave generator still in use today. They can produce medium power levels at microwave wavelengths. In these devices, the electrons are accelerated by a high voltage and are passed through a narrow region where they interact with the electromagnetic wave. As a result, the electrons are "bunched", and in a second narrow region the "bunched" electrons amplify the electromagnetic wave. Some limitations of klystrons are: they are tunable in a narrow range; their construction is very complicated; they require a complicated high voltage source; and since they are not based on a "stimulated" process of amplification, the radiations produced are not very clean and coherent.

(b) Magnetrons: These are primarily used for producing pulses of very high power, e.g., for radar purposes. They contain a complicated construction of high magnetic field, operate at long wavelengths only (cm-wave range); and produce radiations not of high quality.

(c) Cyclotron Masers: These are based on the phenomenon that relativistic electrons in a magnetic field, under the cyclotron resonance conditions, amplify the electromagnetic wave. These devices produce radiations at the frequency of the cyclotron resonance. Very high power levels have been reported, but the demand for a very high magnetic field limits their applications.

(d) Periodic Structure Devices: These have become very popular in recent years, although their principle of operation has been long known. A relativistic electron beam passing through a periodic structure emits radiations whose frequency depends on the velocity of the electrons and on the periodicity of the structure. Therefore, the frequency can be controlled by electron energy, so that they are tunable. However, the need for relativistic electrons and for complicated mechanical constructions, are significant drawbacks of these devices. Following are a few of the known types:

(1) Travelling Wave Tube (TWT), used in the microwave region for amplification; the periodic structure is mechanical.

(2) Free Electron Laser (FEL), based on a periodic structure which is magnetic; this device operates in the optical region.

Some scientists claim that these periodic structure devices are not really "lasers", since they are not based on a stimulated process, but rather are based on the emission of radiations due to their periodic structure. Accordingly, these devices do not have the good coherent properties typical of stimulated processes such as conventional lasers.

BRIEF SUMMARY OF THE INVENTION

An object of the present invention is to provide a new method, and also a new apparatus or device, for amplifying and/or generating electromagnetic radiation. A particular object of the present invention is to provide a new tunable maser (or laser), operating in accordance with the novel method.

According to a broad aspect of the present invention, there is provided a method and apparatus for amplifying and/or generating electromagnetic wave radiation, characterized in producing a gas plasma region having a non-Maxwellian electron distribution by effecting collisions between scattering particles in the gas with free electrons which have been accelerated to an energy level which is greater than that providing maximum probability of collision of the electrons with scattering particles in said gas; and subjecting the electromagnetic wave radiation to said plasma region such as to produce amplification of said radiations by stimulated emission of Bremsstrahlung from scattered free electrons in said plasma region.

As will be more particularly described below, best amplification is achieved when the electromagnetic wave radiation is polarized in a plane parallel to the direction of movement of the scattered free electrons.

Apparent Mechanism of Operation

Although the Bremsstrahlung process has been suggested before as a mechanism for amplification of electromagnetic waves, it was not exploited primarily for two reasons: first, there was no experimental evidence for such a mechanism, and secondly, there was no correct theoretical criterion for amplification. We have experimentally produced amplification by stimulated emission of Bremsstrahlung, and we have also determined theoretically the criterion for amplification.

Following is what we presently consider to be a probable explanation of the mechanism by which amplification is produced in accordance with the invention by stimulated emission of Bremsstrahlung from scattered free electrons in the mentioned non-Maxwellian plasma region.

As known, an electron moving in the field of an electromagnetic wave is periodically accelerated and decelerated by the electric field of the wave. When the electron is accelerated, energy is transferred from the electromagnetic wave to the electron; and when it is decelerated, energy is transferred from the electron to the electromagnetic wave. If no collision occurs, the electron leaves the region of the electromagnetic wave with no exchange of energy with it; but if a collision occurs between the electron and a scattering agent (atom, molecule or ion), energy is exchanged. Thus, an electron colliding in that period of time when it gains energy from the electromagnetic wave, absorbs energy from the electromagnetic wave, and vice-versa. Since the two periods are equal, no net energy is exchanged, unless the probability of the collision process depends on the electron energy. In a normal Maxwellian distribution, most of the electrons are in the energy range where the probability increases with energy; therefore energy is absorbed in the plasma and the electromagnetic wave is attenuated. But when the electrons have been accelerated to the specified energy level, thus creating a non-Maxwellian electron distribution, there occur more collisions in that period of time when the electrons are decelerated; therefore energy is transferred from the electrons to the electromagnetic wave which is amplified.

Mathematical Explanation

Following is a brief mathematical explanation of the above-described mechanism of operation, and also a description of the criteria for amplification.

Suppose that electrons of density $N_e(cm^{-3})$, and distribution $f(\vec{q})$ normalized by:

$$\int d^3 q f(\vec{q}) = 1$$

where $\vec{q}$ is the electron momentum, collide with atoms (or molecules) whose density is $N_a(cm^{-3})$ and whose collision cross-section is $$\frac{d\sigma}{d\Omega} \ (cm^2);$$

and suppose an electromagnetic wave of frequency $$\frac{\omega}{2\pi} \ (sec^{-1})$$

pass a length of L(cm) through the plasma created by these electrons and atoms. Then, the amplification h defined by:

$$h = \frac{(e.m.\ power\ out) - (e.m.\ power\ in)}{(e.m.\ power\ in)}$$

can be calculated (in some approximations) by either of the two following expressions:

$$h = -8\pi e^2 c^{-1} \omega^{-2} L m^{-2} \left(\frac{e}{c} a\right)^{-2} N_e N_a \int d^3 q_1 \int d^3 q_2 \int_0^\pi \frac{d\alpha}{\pi} \left(\frac{e}{c} \vec{a} \cdot \vec{Q} \cos\alpha\right) \times \frac{d\sigma}{d\Omega} [f(\vec{q_1}) - f(\vec{q_2})] \delta\left(q_2^2 - q_1^2 - 2\frac{e}{c} \vec{a} \cdot \vec{Q} \cos\alpha\right) \quad (1)$$

$$h = 8\pi e^2 c^{-1} \omega^{-2} L m^{-3/2} N_e N_a \int d^3 q f(\vec{q}) (2E)^{\frac{1}{2}} \left[\frac{1}{3}(1 + \hat{a}\cdot\hat{q})\delta_M + \hat{a}\cdot\hat{q}E\frac{\partial \delta_M}{\partial E}\right] \quad (2)$$

where (c.g.s. units):
e—electron charge
C—velocity of light
m—electron mass
$\vec{a}$—vector potential of the e.m. wave
$\vec{Q} = \vec{q_2} - \vec{q_1}$ From equations (1) or (2) two expressions can be derived for two limiting cases:

(a) A beam of electrons making an angle $\theta$ with the direction of the electric field vector of the e.m. wave $(\cos \theta = \hat{a}\cdot\hat{q})$ $$h = 8\pi e^2 c^{-1} \omega^{-2} m^{-3/2} L N_e N_a (2E)^{\frac{1}{2}} \left[\frac{1}{3}(1 + \cos^2\theta)\delta_M + \cos^2\theta E \frac{\partial \delta_M}{\partial E}\right] \quad (3)$$

(b) Isotropic distribution of electrons with energy E:

$$h = -8\pi e^2 c^{-1} \omega^{-2} m^{-3/2} L N_e N_a (2E)^{\frac{1}{2}} \frac{1}{3}\left[2\delta_M + E\frac{\partial \delta_M}{\partial E}\right] \quad (4)$$

As can be seen from equations (3) and (4) if $$\frac{\partial \delta_M}{\partial E} < 0,$$

the larger $$\left|E\frac{\partial \delta_M}{\partial E}\right|,$$

the larger is the amplification;

From equation (3) it is clear that best amplification is achieved for $\theta = 0$, i.e. for electrons moving parallel to the polarization of the electromagnetic wave.

For a more complete explanation of the above-described mechanism of operation, and of the criteria for amplification, reference is made to our two papers (1) "Amplification of Millimeter Wave Radiation by Stimulated Emission of Bremsstrahlung", Phys. Rev.

Lett. 45, 1787 (1980); and (2) "Amplification, Current-Voltage Variations, and Refraction in the Interaction between Millimeter Wave Radiation and the Glow Discharge Plasma" both of which are herein incorporated by reference.

GENERAL DESCRIPTION OF SOME EMBODIMENTS OF THE INVENTION

Several embodiments of the invention are described below in which the plasma region, to which the electromagnetic wave radiations are subjected, is the negative-glow cathode region in a cold-cathode glow discharge tube. The electron distribution in this region is non-Maxwellian, since the electrons emitted from the cathode are accelerated in the cathode fall region (1-2 mm from the cathode) to energies of hundreds of electron volts which electrons, making elastic and inelastic collisions, create in the negative glow and Faraday regions a special distribution of electrons with an "inverted" population; i.e., there are more electrons in the high-energy range. This distribution is anisotropic, with preference for the tube-axis direction. For such distributions of electrons, emission outweighs absorption, and the electromagnetic radiation is amplified. The discharge current is also affected by the Bremsstrahlung emission. When the electrons moving in the current direction lose energy to the radiation field, the discharge current decreases, and the electromagnetic radiation is amplified.

One example of the cold-cathode glow-discharge implementation of the invention is more particularly described below (in FIG. 1), together with the observed results (FIGS. 2-5), primarily to explain the invention and to support the above apparent mechanism of its operation. However, several other proposed implementations of the invention are also described below, which would appear to have many advantages over this example insofar as a practical application of the invention is concerned.

Thus, in one described embodiment of the glow-discharge implementation of the invention, the anode and cathode have confronting faces of large surface area, e.g. including at least one dimension larger than their spacing. In another embodiment, the cathode is hollow, and the anode is disposed coaxially within it.

Further embodiments are described wherein the plasma is produced by free electrons accelerated to the required energy level by an electron gun emitting a beam of electrons into a gas region to effect the collisions between scattering particles therein with the free electrons of the beam, to thereby produce the non-Maxwellian electron distribution. One described example includes one electron gun emitting a single beam of electrons into the gas region; and another described example includes a plurality of electron guns disposed annularly around the gas region.

A still further embodiment of the invention is described wherein the gas plasma is produced by a high-frequency high-voltage applied to a pair of electrodes disposed on opposite sides of the gas region.

In all the described embodiments, the invention may be implemented as an amplifier or as a generator. Thus, in an amplifier implementation, the electromagnetic wave radiation would be first generated externally of the mentioned plasma region and would then be transmitted through it for amplification therein. In a generator implementation, the electromagnetic wave radiation would be generated within the mentioned plasma region by a resonant cavity defined by a pair of mirrors, the spacing of the mirrors being adjustable to thereby provide a tunable generator, e.g. maser or laser.

Main Advantages of the Invention

It will thus be seen that the amplification in the present invention is achieved by stimulated emission of Bremsstrahlung from free electrons scattered by atoms (or molecules, ions or other scatterers); and that by the addition of mirrors to form a resonant cavity, a tunable maser (or laser) is produced. Thus, devices can be constructed in accordance with the invention to provide a number of advantages, including the following:

1. Stimulated Emission: Since the amplification is by stimulated emission of radiation, as in conventional masers or lasers, the devices would produce highly coherent outputs.

2. Free Electrons: Since the amplification is by free electrons, the devices would not have a characteristic frequency, and therefore they could be tunable over a very wide frequency range.

3. Bremsstrahlung: Since the scattering particle (atom, molecule or ion) is the "third body" which enables the exchange of energy between the electron and the electromagnetic wave, which "third body" exists in nature in large numbers, such devices would obviate the need for complicated and expensive structures which are now required for the known free electron devices.

4. Energy Range: The electrons needed for amplification in this process are of low energy compared to the energy needed in the other free electron devices; that is, about 50 eV would be needed for devices constructed in accordance with the present invention, as compared to about $5.10^3$ eV for klystrons, and about $5.10^5$ eV for free-electron lasers.

5. High Power Levels: Since no saturation problems are apparently involved in the method and apparatus of the present invention, very high power levels are theoretically obtainable.

6. Wavelengths and Efficiency: Although the Bremsstrahlung process is more efficient at lower frequencies, we found it efficient also in mm-wavelengths with no optimization, and therefore expect it to be efficient in the infra-red regions, and possibly also in the optical wavelength region. The efficiency, theoretically, should therefore be very high in all these wavelengths.

Further features and advantages of the invention will be apparent from the description below.

BRIEF DESCRIPTION OF THE DRAWINGS

The invention is herein described, by way of example only, with reference to the accompanying drawings, wherein:

FIGS. 2-5 illustrate the results of a number of experiments performed utilizing the construction of FIG. 1, and particularly showing the variations of amplification and current change vs. the distance from the cathode, both with respect to a perpendicular and a parallel polarization of the electromagnetic wave radiation;

FIG. 9 schematically illustrates a "hollow cathode" maser constructed in accordance with the invention; FIG. 9a being a transverse sectional view along lines a—a of FIG. 9;

FIG. 10 illustrates an "electron gun" maser constructed in accordance with the invention;

FIG. 11 illustrates a "multiple-electron gun" maser constructed in accordance with the invention, FIG. 11a being a sectional view along lines a—a of FIG. 11.

DESCRIPTION OF PREFERRED EMBODIMENTS

FIGS. 1, 1a and 2-5 (Experimental Amplifier Arrangement)

Figure 1:
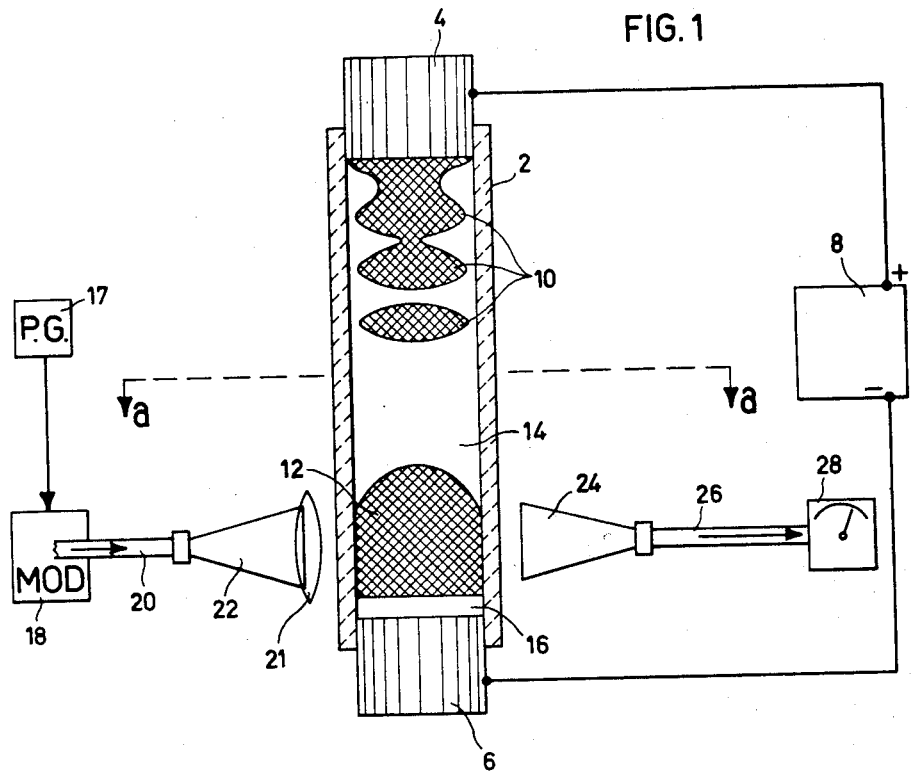
FIG. 1 is a longitudinal sectional view illustrating one form of apparatus constructed in accordance with the invention, FIG. 1a being a transverse sectional view along line a—a of FIG. 1.
Figure 1A:
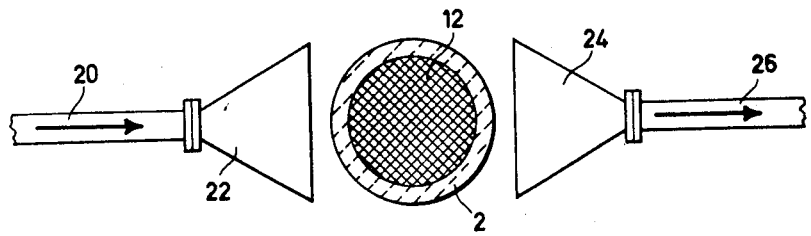

Before describing several preferred embodiments of the invention, reference is first made to FIGS. 1 and 1a showing a simple experimental amplifier set-up in accordance with the invention, and FIGS. 2-5 showing the results of a number of experiments performed utilizing this experimental amplifier arrangement.

Thus, FIG. 1 illustrates a sealed glass tube 2 filled with an ionizable gas and containing an anode 4 at one end and a cathode 6 at the opposite end. These two electrodes are connected to a high DC voltage source 8 so as to produce a glow discharge within the tube. This glow discharge is schematically illustrated in FIG. 1 as including striations 10 of the positive column adjacent to the anode 4, a negative glow zone 12 adjacent to the cathode 6, a Farraday dark space 14 between, and a cathode fall zone 16 between the cathode 6 and the negative glow zone 12.

The negative glow zone 12 is used for amplifying the electromagnetic wave radiations in accordance with the present invention by the electrons accelerated to the required energy level in the cathode fall zone 16.

For purposes of example, FIGS. 1 and 1a illustrate the device used for amplifying externally-generated electromagnetic wave radiations, which radiations are applied from a pulse generator 17, and modulator 18, via an input wave guide 20, converging lens 21 and horn 22, to the negative glow zone 12. As described above, the electromagnetic radiations are amplified within the negative glow zone 12 and are collected by a collecting horn 24 disposed on the opposite side of the tube in alignment with the input horn 22. In the set-up illustrated in FIG. 1, the amplified radiations are outputted via a waveguide 26 to a measuring circuit 28.

Experiments were performed with the set-up illustrated in FIGS. 1 and 1a, wherein the gas was helium of two different pressures (1.0 and 6.0 mm Hg). In this set-up, the inside diameter of tube 2 was 20 mm, and the two electrodes 4 and 6 were of aluminum fixed 90 mm apart. The DC voltage source 8 was 500 volts. The externally-generated electromagnetic wave radiations applied by horn 22 were generated from an IMPATT Oscillator producing 70 mW of electromagnetic radiation, at a frequency of 70 GHz (wavelength 4.3 mm), modulated at 833 Hz, and applied so that the propagation wave vector was perpendicular to the tube axis.

The discharge tube was moved along its axis with respect to the incident electromagnetic wave radiation, to enable measurements to be made at different locations of the discharge tube. Measurements were taken of the variation in the intensity of the collected radiation as a function of the discharge current I. Also measured were the small changes $\Delta I$ in the discharge current, caused by the incident electromagnetic radiation. These measurements were made as a function of the distance X from the cathode 6, of the irradiated region for two polarizations, namely for electric field vectors parallel to, and perpendicular to, the tube axis. Typical results from these measurements are illustrated in the graphs of FIGS. 2-5.

Thus, FIG. 2 illustrates the measured results at a pressure of 1.0 Torr (1.0 mm Hg) with polarization parallel to the tube axis. The upper part (a) illustrates the amplification percent versus the distance X from the cathode 6 for several values of discharge current. In the lower part (b) the small current, changes ($\Delta I$) are plotted versus the distance X at a discharge current of I=mA [negative changes (decrease in current) are drawn upwards].

As shown in part (a) of curve 1, the amplification is maximum (about 10%) with a discharge current (I) of 14 mA, which occurs in the negative glow zone 12 adjacent to the cathode 6, the amplification decreasing up to the beginning of the positive column 10. As shown in part (b) of FIG. 1, the current changes ($\Delta I$) are the highest at the beginning of the positive column 10.

FIG. 3 illustrates the results obtained under the same conditions as in FIG. 2 except for perpendicular polarization of the electromagnetic radiation, i.e. the electric field vector being perpendicular to the tube axis. Here it will be seen that the amplification reached a maximum of about 23% within the negative glow zone 12 when the discharge current (I) was 14 mA.

FIGS. 4 and 5 illustrate the results of comparable experiments performed with a gas pressure of 6.0 mm Hg (6 Torr), wherein it will be seen that the cathode regions contracted toward the cathode. This contraction is seen in FIG. 4 for parallel polarization, but with no significant qualitative difference from the results at the lower pressure illustrated in FIG. 2. However, for perpendicular polarization, shown in FIG. 5, a different behavior is found at the higher pressure (6.0 Torr), wherein it will be seen that the amplification becomes attenuated.

As also seen from FIGS. 2-5, the dependence of amplification on discharge current (I) was nearly linear at all pressures, polarizations, and distances from the cathode, there being a small increase beyond linearity at high current.

Similar experiments were performed as described above with neon (Ne) gas, and the measured results were found to be qualitatively similar to those obtained for He, but the amplification of the radiation for Ne was found to be about twice as large.

It is believed that the above-described mathematical explanation of the probable mechanism by which amplification is achieved by stimulated emission of Bremsstrahlung is consistent with and explains the results observed as illustrated in FIGS. 2-5 using the set-up of FIG. 1. Thus:

(a) The linear dependence on $n_e$ explains the linear dependence of the amplification on the discharge current. The small deviation from linearity follows from the small changes in cathode fall voltage as the current changes.

(b) The dependence on $d\sigma/d\Omega$ explains why amplification for Ne is twice that for He. At electron energies about 20 eV, collision cross sections for Ne are about twice those of He.

(c) The dependence on polarization is expressed by the $\vec{a}\cdot\vec{Q}$ term, and the fact that $f(\vec{q})$ prefers the tube-axis direction.

From the above, it will be seen that the best amplification is achieved when the electrons move parallel to the polarization of the electromagnetic wave, since the perpendicular polarization is much more sensitive to the shape of the distribution function than the parallel one. One probable reason for the finding that maximum amplification is closer to the cathode than the maximum current decrease, is because the large-angle electron scattering collisions, which contribute to amplification more than the small-angle scattering, are less important in evaluating the small current changes. Another probable reason is the recombination effect which is important in the negative glow region. The incident electromagnetic wave reduces the recombination rate between those electrons and ions, and this causes current increase.

Figure 6:
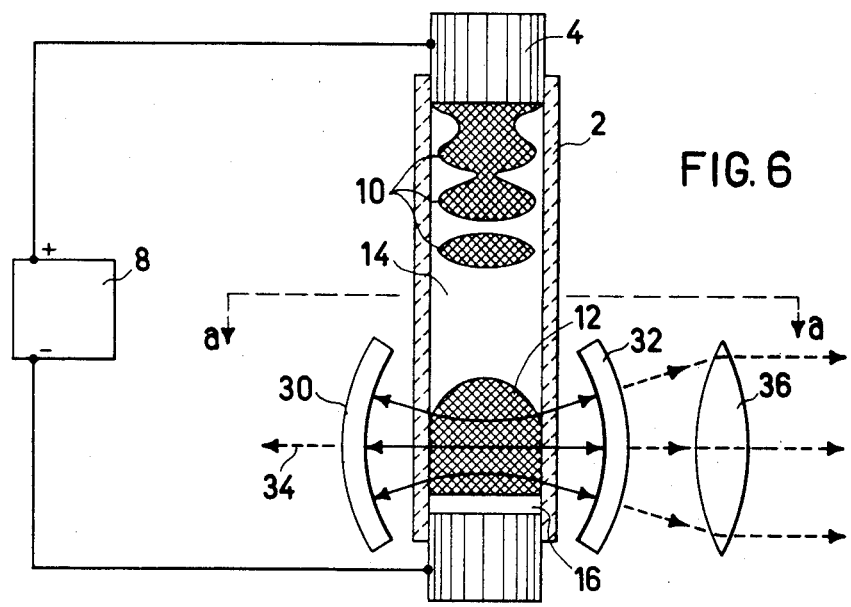
FIG. 6 schematically illustrates another construction in accordance with the invention, FIG. 6a being a transverse sectional view along lines a—a of FIG. 6.
Figure 6A:
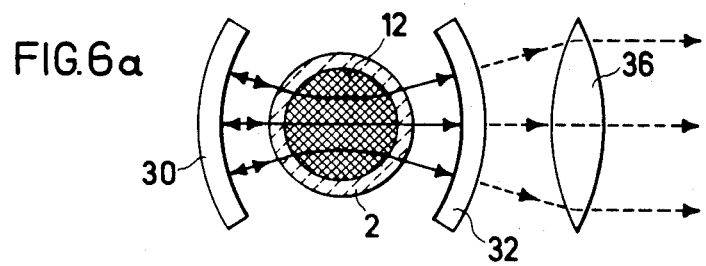

FIGS. 6 and 6a (Tunable Maser or Laser)

FIGS. 6 and 6a illustrate the set-up of FIGS. 1 and 1a modified so as to constitute a simple maser or laser. Thus, instead of amplifying externally-generated electromagnetic wave radiation, the radiation is generated within the tube itself by the provision of a pair of mirrors 30, 32 on opposite sides of the tube negative glow zone 12, which mirrors define a resonant cavity. One mirror, e.g. mirror 30, is made adjustable, as shown schematically by the arrow 34, to enable the dimension of the resonant cavity to be varied, and thereby to enable the maser or laser to be tuned to the desired frequency. The other mirror 32 outputs the generated electromagnetic wave radiation. Output mirror 32 is concave, as is mirror 30, thereby tending to diverge the outputted electromagnetic wave radiation. This can be explained by the following observation:

It is well known that the refraction index N of an electromagnetic wave propagating in plasma is given by:

$$N = \left(1 - \frac{N_e}{N^o}\right)^{\frac{1}{2}}$$

where $$N^o = \frac{m}{4\pi e^2} \omega^2$$

therefore, for $N_e < N^o$, $N < 1$, and a plasma in the shape of a convex lens diverges the electromagnetic wave. This is illustrated in FIGS. 6 and 6a, and is the reason for using concave mirrors 30, 32, and also for the provision of the convex lens 36 to re-converge the outputted electromagnetic wave radiation.

Figure 7:
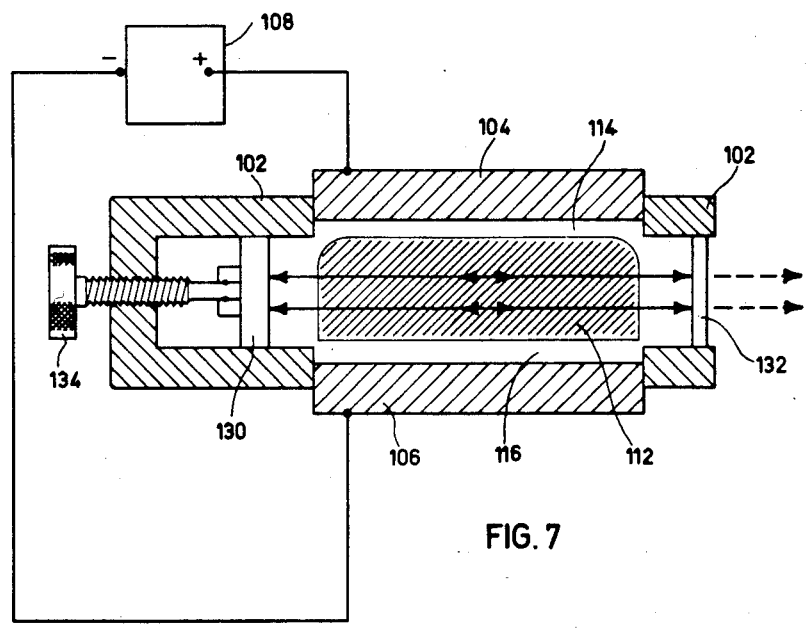
FIG. 7 illustrates a still further construction in accordance with the invention embodied in a tunable maer or laser.
Figure 8:
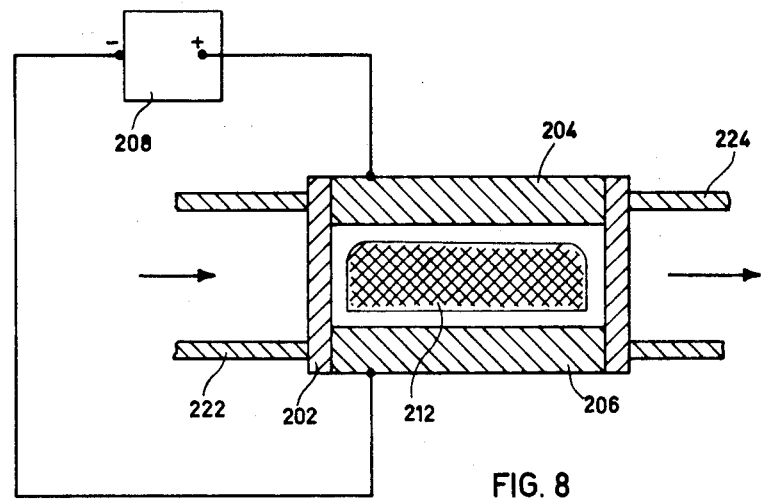
FIG. 8 illustrates the construction of FIG. 7 but used for amplifying an externally-generated electromagnetic wave radiation.

FIGS. 7 and 8 (Flat Construction)

FIGS. 7 and 8 illustrate a more efficient flat construction wherein the amplification is increased by utilizing almost the complete volume of the tube for the negative glow zone. FIG. 7 illustrates this construction using a tunable maser or laser, and FIG. 8 illustrates it used for amplifying an externally-generated electromagnetic wave radiation.

Thus, as shown in FIG. 7, the device includes a housing 102 of insulating material having an anode 104 and a cathode 106 mounted on opposite sides. In this arrangement, however, both the anode and cathode are electrode plates spaced transversely of each other in a sealed housing 102 and have confronting faces of large surface area compared to their spacing. Thus, the electrode plates may be in the form of circular discs having diameters substantially larger than their spacing within the envelope.

Housing 102 is filled with an ionized gas, and the electrodes are driven by a high voltage DC source 108 so as to ionize the gas and thereby to produce a negative glow zone 112, a Farraday dark space 114 adjacent to the anode 104, and a cathode fall zone 116 adjacent to the cathode 106. As described above with respect to FIG. 1, the cathode fall zone accelerates the electrons to the required energy level to produce the amplification in the negative glow zone 112.

Housing 102 further includes a pair of mirrors 130, 132 defining a resonant cavity aligned with the negative glow zone 112. Mirror 130 is adjusted by a screw 134 extending exteriorly of the housing 102 to permit the spacing between the mirrors to be adjusted, and thereby to permit tuning of the frequency output radiations, the latter being transmitted via mirror 132.

Housing 102 is made of any suitable insulating material. The anode 104 and the cathode 106 are made of metal. Since the negative glow zone 112 fills substantially the complete volume within the housing 102, high amplification is produced. In addition, since the electromagnetic radiations are generated within the envelope and transmitted through the mirror 132, losses in transmitting the electromagnetic radiations through glass are reduced.

It will be appreciated that the arrangement illustrated in FIG. 7 could also be used for amplifying externally-generated electromagnetic wave radiations. This is illustrated in FIG. 8, wherein the device includes a sealed housing 202, an anode 204 and a cathode 206 similar to the arrangement illustrated in FIG. 7 except that the housing 202 is of glass, and also does not include within it the mirrors 130, 132 defining the resonant cavity. Instead, an externally-generated electromagnetic wave radiation is directed to the negative glow zone 212 within the tube by means of a waveguide 222, and amplified radiation is outputted via another waveguide 224. The device illustrated in FIG. 8 is otherwise of the same construction as described above with respect to FIG. 7, including the high voltage DC source 208 applied between the anode and cathode for ionizing the gas within the device and producing the negative glow zone 212 in which occurs the amplification of the electromagnetic wave radiation.

FIGS. 9 and 9a (Hollow Cathode)

FIGS. 9 and 9a illustrate a "hollow cathode" maser (or laser), in which the housing or envelope is substantially constituted of a hollow cathode 304 of cylindrical configuration and closed at its opposite ends by end plates 302, e.g. of glass. The anode 306 is disposed coaxially within the hollow cathode 304. A high voltage DC source 308 is connected across the anode 306 and cathode 304 to ionize the gas within the device, and thereby to produce a negative glow zone 312 occupying substantially the complete volume within the hollow cathode 304, a Farraday dark space 314 adjacent to the anode 306, and a cathode fall zone 316 adjacent to the cathode 304. The device further includes a pair of mirrors 330, 332 defining a resonant cavity, one of which mirrors (e.g. 330) is adjustable to tune the frequency of the cavity. Mirror 332 is partially transparent to output the generated electromagnetic wave radiation to a collimating lens 336.

The construction illustrated in FIGS. 9 and 9a exploits the special refraction properties of the plasma. Thus, the electron density is low in the center adjacent the anode 306, and increases towards the outer region, i.e. towards the cathode 304. Therefore the refriction index (N) becomes smaller than "1" in the outer region. As a result, the plasma concentrates the electromagnetic wave in a manner similar to an optical fiber. This is the reason for the convex configuration of the mirrors 330 and 332, and the provision of a concavo-concave collimating lens 336.

It will be appreciated that the device illustrated in FIGS. 9 and 9a can also produce electromagnetic wave radiations of circular polarization. Further, the device may be used for amplifying externally-generated electromagnetic wave radiation by merely omitting the mirrors 330, 332.

FIGS. 10 and 11 (Electron Gun Types)

FIG. 10 illustrates an arrangement wherein the free electrons accelerated to the required energy level are supplied by an electron gun emitting a beam of electrons into gas for producing the gas plasma region; and FIG. 11 illustrates a similar arrangement wherein there are a plurality of electron guns disposed annularly around the gas region.

Thus, as shown in FIG. 10, the device includes a housing or envelope 402 filled with a gas, e.g. helium, neon or argon, closed at its opposite ends by a pair of mirrors 430, 432 defining resonant cavity. The accelerated free electrons are produced by an electron gun, generally designated 440, including a cathode 442 emitting a beam of electrons. This beam passes through an aperture 444 in an accelerating grid, and a further aperture 446 in the end wall 448 of the electron gun section of the housing, and enters the gas-containing housing section 402 perpendicular to its longitudinal axis. Opening 446 is very fine, to accommodate only the diameter of the electron beam, and thereby permits the electron gun section 440 of the housing to be substantially evacuated by pump 450, while a gas supply 452 retains the housing section 402 between the mirrors 430, 432 substantially filled with gas. The generated radiation is outputted via mirror 432 which is partially transparent.

The arrangement illustrated in FIG. 10 is to be distinguished from the previously-disclosed arrangements illustrated in FIGS. 1-9. Thus, in the FIG. 1-9 arrangements the gas plasma region having the non-Maxwellian electron distribution is produced by effecting collisions between scattering particles in a gas with free electrons emitted from a cathode and accelerated to the required energy level by the high voltage in the cathode fall region from a cathode glow discharge tube. The arrangement illustrrated in FIG. 10, however, produces the non-Maxwellian electron distribution in a gas plasma region by supplying a beam of free electrons from an electron gun which accelerates the electrons to the required energy level to effect the collisions between scattering particles in the gas. The electron gun arrangement of FIG. 10 theoretically would enable better control of the electron distribution within the plasma region.

The arrangement of FIG. 11, providing an annular array of electron guns, enables even better control and optimization of the electron distribution. Thus, the housing 502 which contains the gas, is of annular configuration and is surrounded by an annular array of electron guns 540 all oriented so that their respective electron beams, passing through their respective apertures in accelerating grid 544, all intersect at the center of housing 502. As in the arrangement of FIG. 10, mirrors are applied to the opposite ends of housing gas section 502 (only mirror 530 being illustrated in FIG. 11a) to define a resonant cavity for generating the electromagnetic wave radiation.

Figure 12:
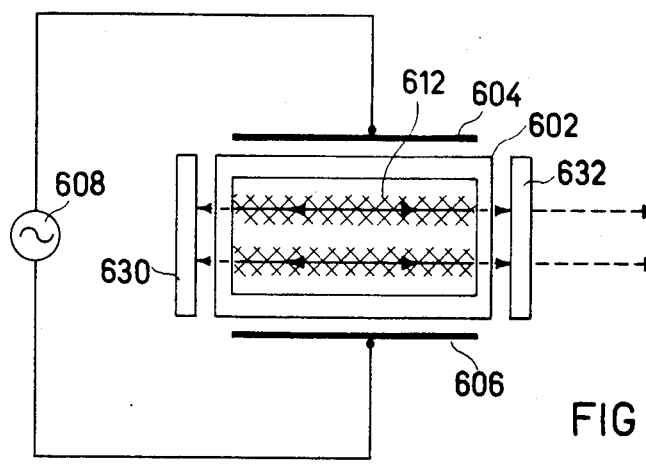
FIG. 12 illustrates a "high frequency discharge plasma" maser constructed in accordance with the invention.

FIG. 12 (High-Frequency-Discharge Plasma)

FIG. 12 illustrates another arrangement, wherein the plasma is created in the gas by a high-frequency high voltage. Thus, as shown in FIG. 12, there is provided a gas-filled housing 602 having a pair of electrodes 604, 606 disposed on opposite sides. These electrodes are connected across a high-frequency high-voltage generator 608 which produces the plasma 612 within the housing. The device further includes a pair of mirrors 630, 632 defining the resonant cavity for generating the electromagnetic wave radiation, the latter being outputted via the partially-transparent mirror 632.

Thus, in the arrangement illustrated in FIG. 12 the free electrons are present within the gas region itself, these electrons being accelerated by the high-frequency, high-voltage field to the required energy level at which they effect the collisions between scattering particles in the gas to produce the gas plasma region having the non-Maxwellian electron distribution. As described earlier, for such distribution of electrons, emission outweighs absorption, and therefore the electromagnetic radiation, also generated within the gas region, is amplified. By the provision of the two mirrors 630, 632 defining a resonant cavity, there is produced a microwave generator which may be tuned by varying the spacing between the mirrors.

The arrangement illustrated in FIG. 12 provides the advantage that the electrodes need not be in contact with the gas, but can be externally of the sealed envelope 602. The motion of the electrons is mainly in the direction of the high-frequency field produced by generator 608, and therefore high efficiency should be achieved when the polarization of the electromagnetic wave is in that direction. The electron distribution is controlled by the frequency and voltage of generator 608, which frequency should preferably be in the megacycle region.

As described above, best amplification results are obtained when the electromagnetic wave radiation is polarized in a plane parallel to the direction of movement of the scattered free electrons. The plane of polarization of the electromagnetic wave radiations, in the embodiment illustrated in FIG. 12 as well as in the other described embodiments, can be pre-fixed according to known techniques, for example by the use of Brewster windows.

While the invention has been described with respect to a number of embodiments, it will be appreciated that these are set forth for purposes of example only, and that many other variations, modifications and applications of the invention may be made.

What is claimed is:

1. A method of amplifying and/or generating electromagnetic wave radiation, characterized in:
producing a gas plasma region having a non-Maxwellian electron distribution by effecting collisions between scattering particles in the gas with free electrons which have been accelerated to an energy level which is greater than that providing maximum probability of collision of the electrons with scattering particles in said gas;
and subjecting the electromagnetic wave radiation to said plasma region such as to produce amplification of said radiation by stimulated emission of Bremsstrahlung from scattered free electrons in said plasma region.

2. The method according to claim 1, wherein said electromagnetic wave radiation is generated externally of said plasma region and is transmitted therethrough for amplification therein.

3. The method according to claim 1, wherein said electromagnetic wave radiation is generated within said plasma region by means of a resonant cavity defined by a pair of mirrors.

4. The method according to claim 3, wherein said generated electromagnetic wave radiation is tunable by varying the spacing between said pair of mirrors.

5. The method according to claim 1, wherein said plasma region to which the electromagnetic wave radiation is subjected is the negative-glow cathode region of a glow discharge produced between an anode and cathode of a flow discharge tube.

6. The method according to claim 5, wherein said anode and cathode are spaced axially of each other in a sealed envelope.

7. The method according to claim 5, wherein said anode and cathode are spaced transversely of each other in a sealed envelope and have confronting faces of large surface area including at least one dimension larger than their spacing in said envelope.

8. The method according to claim 5, wherein said cathode is hollow, and said anode is disposed axially within the hollow cathode.

9. The method according to claim 8, wherein the electromagnetic wave radiation is circularly polarized.

10. The method according to claim 1, wherein the free electrons are supplied by at least one electron gun emitting a beam of electrons into a gas to produce said plasma region.

11. The method according to claim 10, wherein there are a plurality of electron guns dispose annularly around said plasma region.

12. The method according to claim 1, wherein said plasma region is produced by a high frequency voltage applied to a pair of electrodes disposed on opposite sides of a gas-filled tube.

13. Apparatus for amplifying and/or generating electromagnetic wave radiation, characterized in that it includes:
means for producing a gas plasma region having a non-Maxwellian electron distribution by effecting collisions between scattering particles in the gas with free electrons which have been accelerated to an energy level which is greater than that providing maximum probability of collision of the electrons with scattering particles in said gas;
and means for subjecting the electromagnetic wave radiation to said plasma region such as to produce amplification of said radiations by stimulated emission of Bremsstrahlung from scattered free electons in said plasma region.

14. Apparatus according to claim 13, further including a generator for geherating said electromagnetic wave radiation externally of said plasma region, and means for transmitting said radiation through said plasma region for amplification therein.

15. Apparatus according to claim 13, further including a resonant cavity within said plasma region defined by a pair of mirrors for generating said electromagnetic wave radiation.

16. Apparatus according to claim 15, wherein the spacing between said pair of mirrors is adjustable for adjusting the frequency of said generated electromagnetic wave radiation.

17. Apparatus according to claim 13, wherein said plasma region to which the electromagnetic wave radiation is subjected is the negative-glow cathode region of a glow discharge produced between an anode and cathode of a glow discharge tube.

18. Apparatus according to claim 17, wherein said anode and cathode are spaced axially of each other in a sealed envelope.

19. Apparatus according to claim 17, wherein said anode and cathode are spaced transversely of each other in a sealed envelope and have confronting faces of large surface area including at least one dimension larger than their spacing in said envelope.

20. Apparatus according to claim 17, wherein said cathode is hollow, and said anode is disposed axially within the hollow cathode.

21. Apparatus according to claim 20, wherein the electromagnetic wave radiation is circularly polarized.

22. Apparatus according to claim 13, wherein the free electrons are supplied by at least one electron gun emitting a beam of electrons into said plasma region.

23. Apparatus according to claim 22, wherein there are a plurality of electron guns disposed annularly around said plasma region.

24. Apparatus according to claim 13, whrein said plasma region is produced by a high frequency voltage applied to a pair of electrodes disposed on opposite sides of a gas-filled tube.

* * * * *